United States Patent

Takiguchi

[11] Patent Number: 6,062,888
[45] Date of Patent: May 16, 2000

[54] WIRE HARNESS DEVICE FOR USE IN INSTRUMENT PANEL

[75] Inventor: Shuji Takiguchi, Shizuoka, Japan

[73] Assignee: Yazaki Corporation, Tokyo, Japan

[21] Appl. No.: 09/126,765

[22] Filed: Jul. 31, 1998

[30] Foreign Application Priority Data

Jul. 31, 1997 [JP] Japan .................................... 9-205967

[51] Int. Cl.⁷ ................................................. H01R 13/64
[52] U.S. Cl. ............................ 439/248; 439/34; 439/247
[58] Field of Search ............................ 439/34, 247, 248, 439/544

[56] References Cited

U.S. PATENT DOCUMENTS

| | | | |
|---|---|---|---|
| 4,780,090 | 10/1988 | Sugiyama et al. | 439/247 |
| 5,460,530 | 10/1995 | Toba et al. | 439/34 |
| 5,876,228 | 3/1999 | Hayashi | 439/248 |
| 5,919,055 | 7/1999 | Hattori | 439/34 |

FOREIGN PATENT DOCUMENTS 9-306608  11/1997  Japan .

*Primary Examiner*—Paula Bradley
*Assistant Examiner*—Katrina Davis
*Attorney, Agent, or Firm*—Armstrong, Westerman, Hattori, McLeland & Naughton

[57] ABSTRACT

A wire harness device for inpane includes: an electrical instrument unit having a first connector to be connected to a harness; an instrument panel (inpane) having an attachment portion for the electrical instrument unit, the attachment portion having an insertion hole corresponding to the first connector; an air duct to be assembled with the inpane; a harness for the inpane which is provided with a second connector for receiving the electrical instrument unit and to be connected to the first connector of said electrical instrument unit; and a box-shaped connector holder for holding the second connector, which is provided in the air duct and movably positioned for the insertion hole. The wire harness device for inpane can easily make assembling of the instrument panel with an air duct, connection of an electrical instrument unit to a wire harness for an instrument panel and assembling of such a unit to the inpane by means of an improvement in the positioning accuracy of a unit receiving connector.

4 Claims, 8 Drawing Sheets

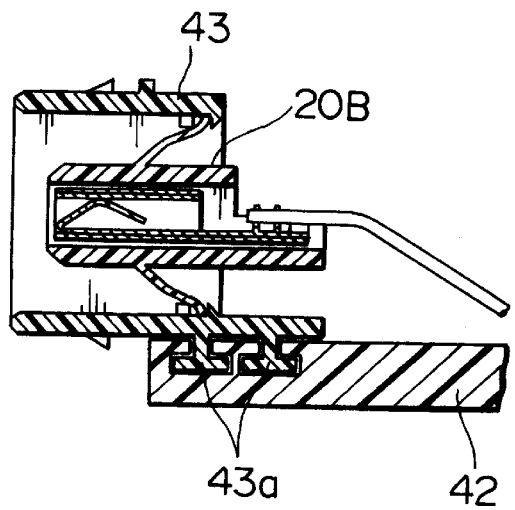
F I G. 5
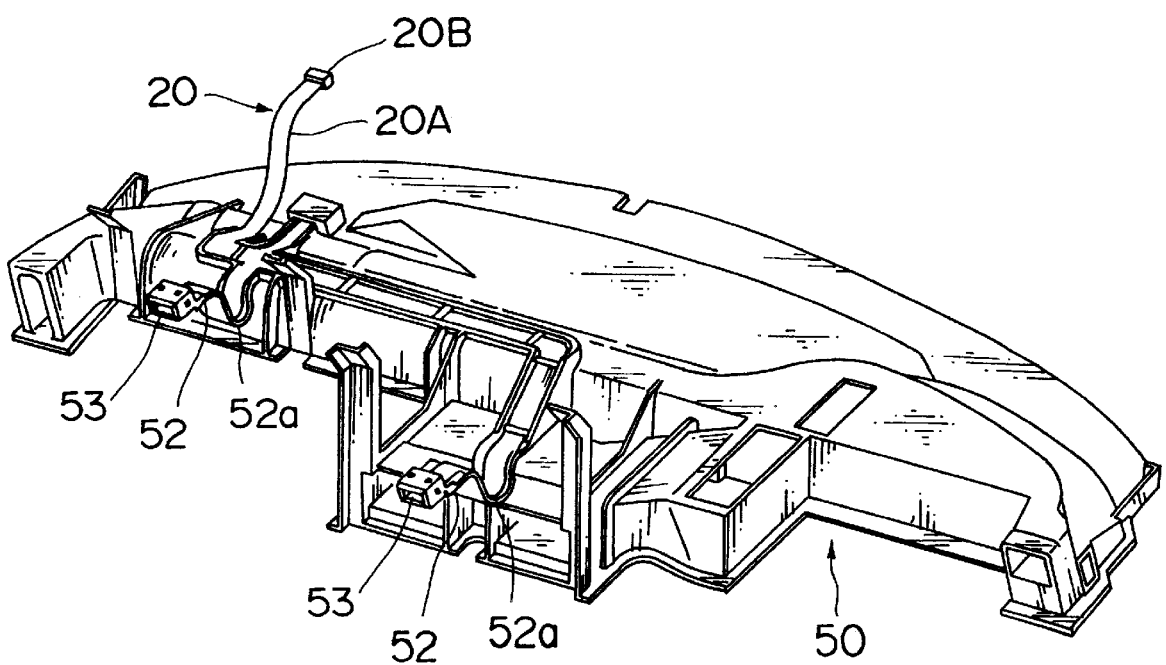
F I G. 6

WIRE HARNESS DEVICE FOR USE IN INSTRUMENT PANEL

BACKGROUND OF THE INVENTION

1. Field of the Invention

The present invention relates to a wire harness for use in an instrument panel of a motor vehicle, and more particularly to a wire harness for use in an instrument panel (hereinafter also referred to simply as "inpane"), which can easily make assembling of the inpane with an air duct, and connection or assembling of an electrical instrument unit to the inpane by means of an improvement in the positioning accuracy of a unit receiving connector

2. Description the Related Art

A wire harness for use in an inpane as shown in FIGS. 10–13 has been proposed in order to improve connection between several kinds of electric instruments on an inpane and a harness for inpane (Japanese Patent Appln. 8-121999).

FIG. 10 is an exploded perspective view showing a wire harness device for use in an instrument panel. FIG. 11 is a perspective view of an air duct and a wire harness which constitute the wire harness device. FIG. 12 is an enlarged view of a connector holder arranged on the air duct. FIG. 13 is a sectional view of the state where a unit receiving connector is attached to the connector holder.

In FIG. 10, reference numerals 111 and 112 denote a center cluster unit and a meter unit which serve as electrical instrument units. From the rear side of these electrical instrument units 111 and 112, connectors to be connected to a harness 140 are protruded which are prepared for electric connection with a unit receiving connector 140B of the harness 140 for an instrument panel 140, described later.

Reference numeral 120 denotes an instrument panel which is a large size resin mold product. On the center and right side thereof, attachment regions 121 and 122 for the electrical instrument units 111 and 112 are formed. On both right and left ends thereof, air blow-off openings 123 and 124 each equipped with a fin for adjusting a flow rate are formed.

Reference numeral 130 denotes an air duct, which is a large-sized resin mold product like the instrument panel 120, is combined with the instrument panel 120.

As seen from FIGS. 11–13, on the regions corresponding to the attachment regions of the instrument panel 120 of the air duct 130, connector holder frames 130A which serve to hold unit receiving connectors 140B of the harness 140 for inpane are integrally formed.

On the front wall of the connector holder 130A, a step-like connector fitting opening 131 is made. Below both sides of the connector fitting opening 131, engagement pieces 132 are provided for holding the unit receiving connector 140B.

Bosses 122, which are to be fitted into holes 125 formed on the underside of the instrument panel, are protruded from the flange of the upper surface of the connector holder 130A.

As shown in FIG. 10, the wire harness 140 for use in the instrument panel is made of a flexible printed board 140A. As seen from FIGS. 12 and 13, the flexible printed board 140A with the ends folded is mounted in the housing 141 to form the unit receiving connector 140B.

On the upper/lower and left/right sides of the housing 141 of the unit receiving connector 140B, six spring pieces 142 are formed.

When the unit receiving connector 140B is fit in the connector fitting opening 131, each spring piece 142 is brought into elastic contact with the inner wall of the connector holder 130A so that the unit receiving connector 140B is movably supported horizontally and vertically.

In the wire harness device described above, the wire harness 140 for the instrument panel is combined with the air duct 130 which is assembled with the instrument panel 120.

When the electrical instrument units 111 and 112 are attached to the attachment regions of the instrument panel 120, the connectors (not shown) of the electrical instrument units 111 and 112 are connected to the unit receiving connectors 140B positioned by the connector holder 130A of the air duct 130.

Even if the connector holder 130A is slightly shifted in position owing to the size error in the air duct which is a large-sized resin molding product, the unit receiving connector 140, when coupled with the connector to be connected to the harness for inpane, is moved vertically and horizontally to correct the position error.

In the above wire harness device for inpane, the position error of the connector holder 130A is corrected by only the movement of the unit receiving connector 140B. Therefore, if the size error of the air duct 130 is large, the position error cannot be corrected by only the vertical and horizontal movement of the unit receiving connector 140B.

Thus, if the position error occurs in the air duct 130, it becomes difficult to make assembling of the instrument panel 120 and air duct 130, connection of the electrical instrument units 111 and 112 and the harness for the inpane and assembling of these electrical instrument units with the inpane 120. This requires an improvement of the positioning accuracy of the unit receiving connector 140B.

SUMMARY OF THE INVENTION

An object of the present invention is to provide a a wire harness device for inpane, which can easily making assembling of the instrument panel with an air duct, connection of electrical instrument units to a harness for inpane and assembling of these unit to the inpane by means of an improvement in the positioning accuracy of a unit receiving connector.

In order to attain the above objective, a wire harness device for inpane according to the present invention comprises: an electrical instrument unit having a first connector to be connected to a harness; an instrument panel (inpane) having an attachment portion for the electrical instrument unit, said attachment portion having an insertion hole corresponding to the first connector; an air duct assembled with the inpane; a harness for the inpane which is provided with a second connector for receiving the electrical instrument unit and to be connected to the first connector of the electrical instrument unit; and a box-shaped connector holder for holding the second connector, which is provided in the air duct and movably positioned for the insertion hole.

Preferably, the box-shaped connector holder is integrally attached to the air duct.

Further, the wire harness device for inpane further comprising: an elastic bracket plate for elastically supporting the connector holder, the bracket plate being attached to the air duct and integral to the connector holder, in which the connector holder is engageable with the insertion hole through elastic displacement of the bracket.

Preferably, a housing constituting the second connector has spring pieces attached at upper, lower, right and left positions on its outer surface and the connector holder has engagement pieces attached to an inner surface, which are to be engaged with the spring pieces, respectively.

Preferably, a first guiding slope sloping toward a center of said connector holder is formed on the periphery of a tip of the connector holder, and a second guiding slope sloping toward a center of said insertion hole is formed on the periphery of the insertion hole.

Preferably, the bracket plate has an elastic portion at its intermediate zone so that the connector holder is displaceable.

Preferably, the elastic portion is curved.

Preferably, a groove for locating the harness for the inpane is formed on a rear surface of the air duct, and the bracket is provided integrally to the groove and its elastic portion is curved downwardly.

Preferably, the elastic portion is made of an elastic material.

Preferably, the elastic portion is thinned.

The above and other objects and features of the present invention will be more apparent from the following description taken in conjunction with the accompanying drawings.

BRIEF DESCRIPTION OF THE DRAWINGS

FIG. 5 is a sectional view of the connector holder attached to the air duct and a unit receiving connector housed in the connector holder;

FIG. 6 is a perspective view of an air duct and a wire harness for inpane combined therewith, which constitute a wire harness device for inpane according to the third embodiment of the present invention;

DESCRIPTION OF THE PREFERRED EMBODIMENTS

Figure 1:
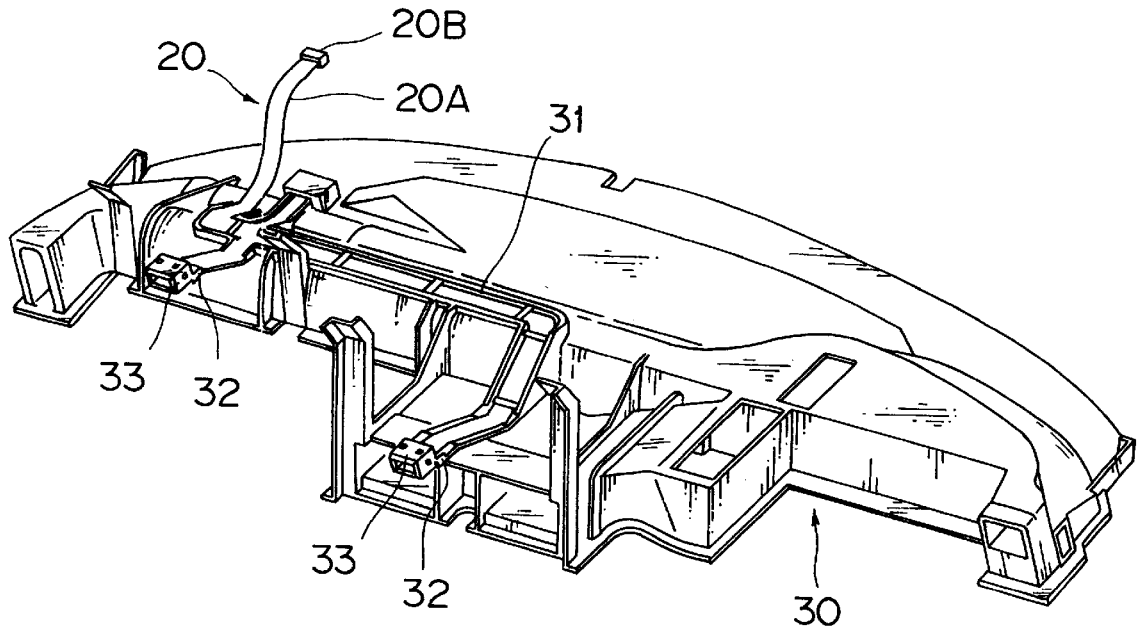
FIG. 1 is a perspective view of an air duct and a harness for inpane combined therewith, which constitute a wire harness device for inpane according to the first embodiment of the present invention.

Now referring to the drawings, an explanation will be given of several embodiments of the present invention.

Embodiment 1

In FIG. 1, a harness 20 for inpane is composed of a collected bundle 20A of blanched electric wires and a unit receiving connector 20B attached to the ends of the bundle 20A.

Figure 2:
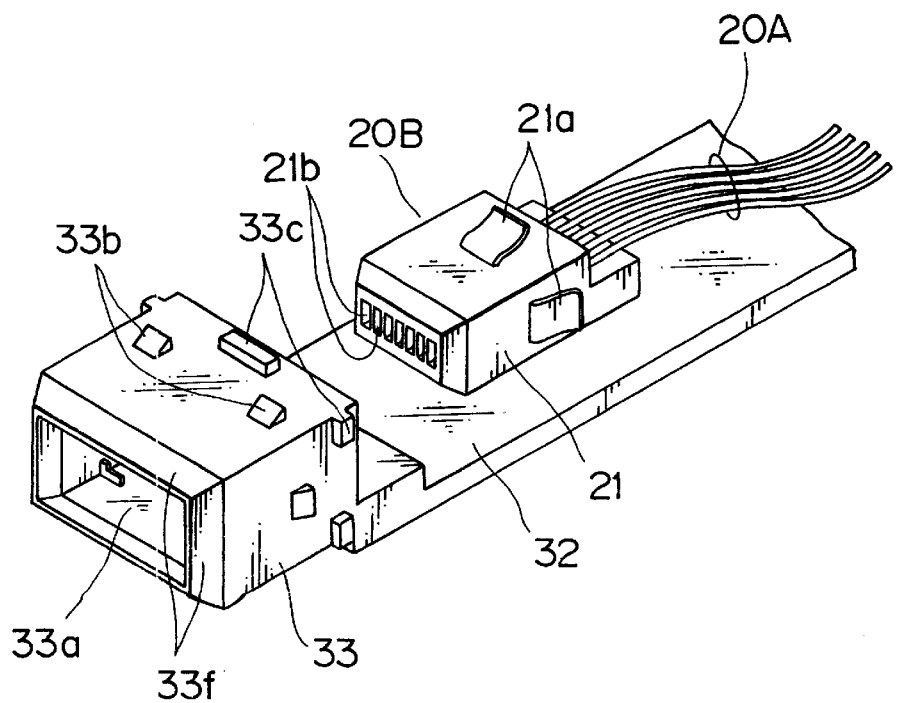
FIG. 2 is an enlarged perspective view of a connector holder attached to the air duct and a unit receiving connector attached to the harness for inpane.
Figure 3:
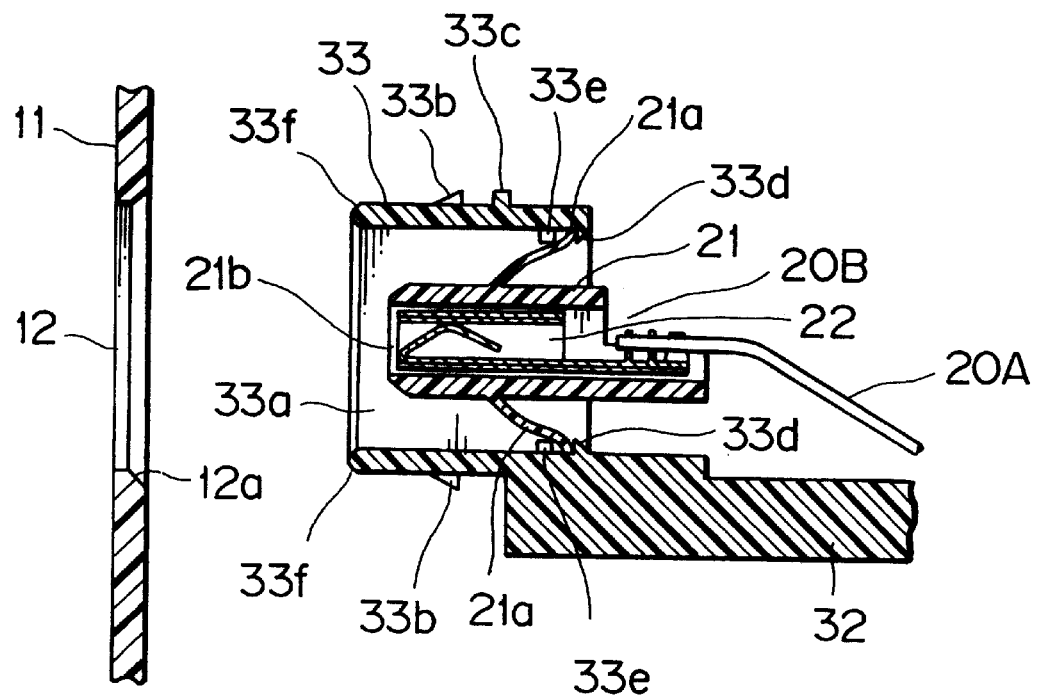
FIG. 3 is a sectional view showing the assembled state of the connector holder and unit receiving connector.

As seen from FIGS. 2 and 3, the unit receiving connector 20B is provided with spring pieces 21a on the upper, lower, left and right surfaces of a housing 21. A terminal 22 connected to individual electric wires of the electric wire bundle 20A is housed in each of a plurality of terminal chambers 21b.

Referring to FIG. 1 again, an entire air duct 30 is integrally molded of synthetic resin by injection molding using a sliding coma.

The air duct 30 is assembled with an inpane (not shown). The center and left sides of the air duct 30 correspond to two attachment regions of an electrical instrument unit (not shown) formed on the inpane.

On the upper surface of the air duct 30, a groove 31 for locating the harness 20 for inpane is formed. The groove 31 is branched so as to correspond to the wire harness 20 for inpane.

An elastic bracket plate 32 is extended from each of ends of the groove 31 branched into the center and left side of the air duct 30. A box-shape connector holder 33 is integrated to the tip of the bracket 32.

The connector holder 33 is located to correspond to insertion hole 12 formed in the back wall 11 in an attachment region of the inpane (FIG. 3).

As seen from FIGS. 2 and 3, the connector holder 33 has a housing space 33a for the unit receiving connector 20B. On each of the outer surfaces of the upper, lower, left and right walls constituting the housing space 33a, an engagement piece 33b and stopper 33c which constitute an engagement portion.

The interval between the engagement piece 33b and stopper 33c is substantially equal to the thickness of the back wall 11 at the attachment region of the inpane. Thus, when the connector holder 33 is inserted in the insertion hole 12, the back wall 11 is sandwiched by the engagement piece 33b and stopper 33c so that the connector holder 33 is engaged in the insertion hole 12.

On the internal face of the upper, lower, left and right walls constituting the housing space 33a of the connector holder 33, a securing piece 33d and a stopper 33e which serve as a securing portion are provided. When the unit receiving connector 20B is housed in the housing space 33a, the end of each of the spring piece 21a of the unit receiving connector 20B enters between the securing piece 33d and stopper 33e so that the unit receiving connector 20B is secured within the housing space 33a.

Further, on the periphery of the tip of the connector holder 33, a guiding slope 33f which slopes toward the center of the connector holder 33. In conformity with the slope, on the periphery of the side of the insertion hole 12 where the connector holder 33 is to be inserted, another guiding slope 12a which slopes toward the center of the insertion hole 12 is formed.

When the connector holder 33 is inserted into the insertion hole 12 through these guiding slopes 33f and 12a, the tip of the connector holder 33 is guided into the insertion hole 12 so that insertion and engagement therebetween can be smoothly made.

In the operation of the wire harness device for inpane described above, first, the harness 20 for inpane is placed on the groove 31 and the unit receiving connector 20B is housed in the connector holder 33.

The air duct 30 is attached to the inpane. At this time, the connector holder 33 of the air duct 30 is inserted in and engaged with the insertion hole 12 formed in the attaching region of the inpane. Thus, the unit receiving connector 20B is positioned for the connector (not shown) of the electrical instrument unit attached to the attaching portion of the inpane.

In such a configuration, the connector holder 33 is engaged in the insertion hole 12 of the inpane so that the unit receiving connector 20B can be positioned at high accuracy for the connector of the electrical instrument unit.

Even if the inpane or air duct 30 has a large size error, because the connector holder 33 is elastically supported by the bracket 32, the position of the connector holder 33 relative to the insertion hole of the inpane can be varied by warping the bracket. Thus, the position variation of the connector holder 33 relative to the insertion hole 12 of the inpane can be corrected in a wide range.

Further, since the unit receiving connector 20B is vertically and horizontally movable through four spring pieces 21a within the space 33a of the connector holder 33, the positioning of the electrical instrument unit relative to its connector to be connected to the harness can be adjusted minutely.

In this way, the positioning accuracy of the unit receiving connector 20B can be improved and the position variation of the connector holder 33 can be corrected in a wide range. This easily makes assembling of the instrument panel with the air duct 30, connection of electrical instrument units to the wire harness 20 for an instrument panel and assembling of these unit to the inpane by means of an improvement in the positioning accuracy of a unit receiving connector.

Embodiment 2

An explanation will be given of the wire harness device for inpane according to the second embodiment.

Figure 4:
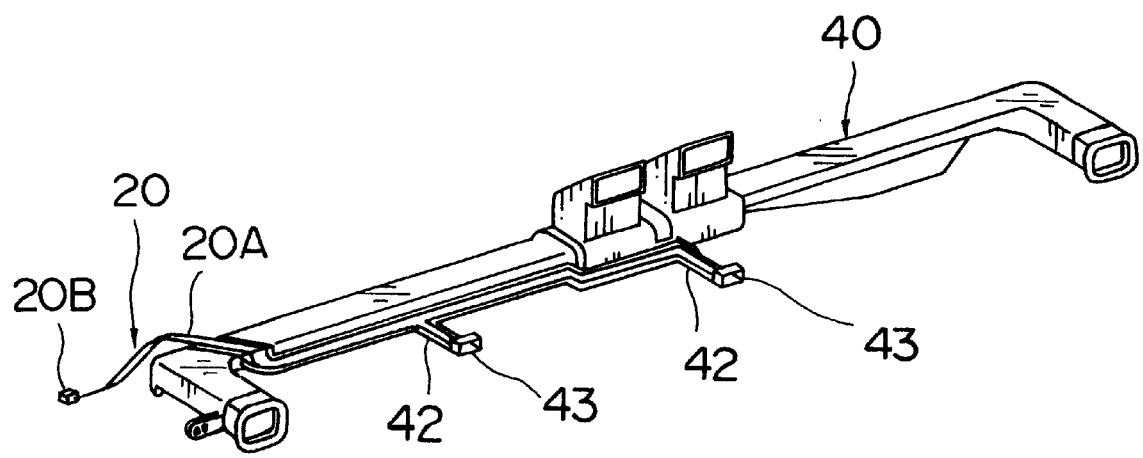
FIG. 4 is a perspective view of an air duct constituting a wire harness device for inpane according the second embodiment of the present invention.

In the first embodiment, as shown in FIGS. 1 and 3, the entire air duct 30 including the connector holder 33 was formed integrally. On the other hand, in this embodiment, as shown in FIGS. 4 and 5, a connection holder 43 having an inverted T-shape anchor 43a is formed individually from the air duct 40. In blow molding of the air duct 40, the connector holder 43 is set in a mold and integrated to the tip of the bracket 42.

Also in the wire harness device for inpane according to this embodiment having such a configuration, as in the first embodiment, the positioning accuracy of the unit receiving connector 20B can be improved and the position variation of the connector holder 33 can be corrected over a wide range. This easily makes assembling of the instrument panel with the air duct 30, connection of electrical instrument units to the harness 20 for inpane and assembling of these unit to the inpane by means of an improvement in the positioning accuracy of a unit receiving connector.

Embodiment 3

Figure 7:
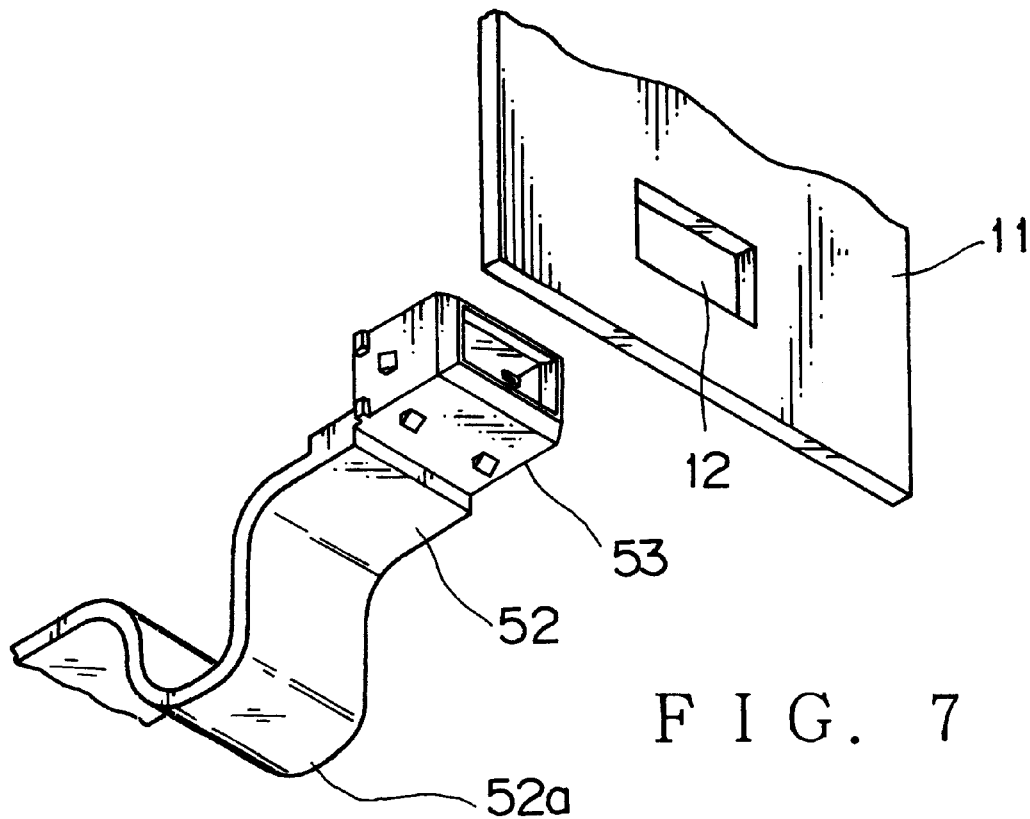
FIG. 7 is a perspective view of a bracket and a connector holder which constitute the air duct.

Referring to FIGS. 6 and 7, an explanation will be given of the wire harness device for inpane according to the third embodiment of the present invention.

As seen from FIGS. 6 and 7, in the wire harness device for inpane according to this embodiment, the intermediate portion of the bracket 52 integrated to the air duct 50 is bent downwardly to form an elastic portion 52a so that the connector holder 53 supported by the bracket is displaceable.

Further, as shown in FIG. 7, the connector holder 53 supported by the bracket 52 is positioned relatively to the insertion hole 12 formed on the back wall of the attachment region of the inpane (not shown).

If the inpane or air duct 50 has a position error, position discrepancy between the connector holder 53 and the insertion hole 12 occurs. Therefore, when the air duct 50 is assembled with the inpane, the tip of the connector holder 3 is lodged in the insertion hole 12. In such a case also, according to this embodiment, the elastic portion 52a of the bracket 52 is moved elastically so that the position discrepancy of the connector holder 53 relative to the insertion hole 12 is corrected, thereby permitting the connector holder 53 to be inserted into the insertion hole.

Embodiment 4

Figure 8:
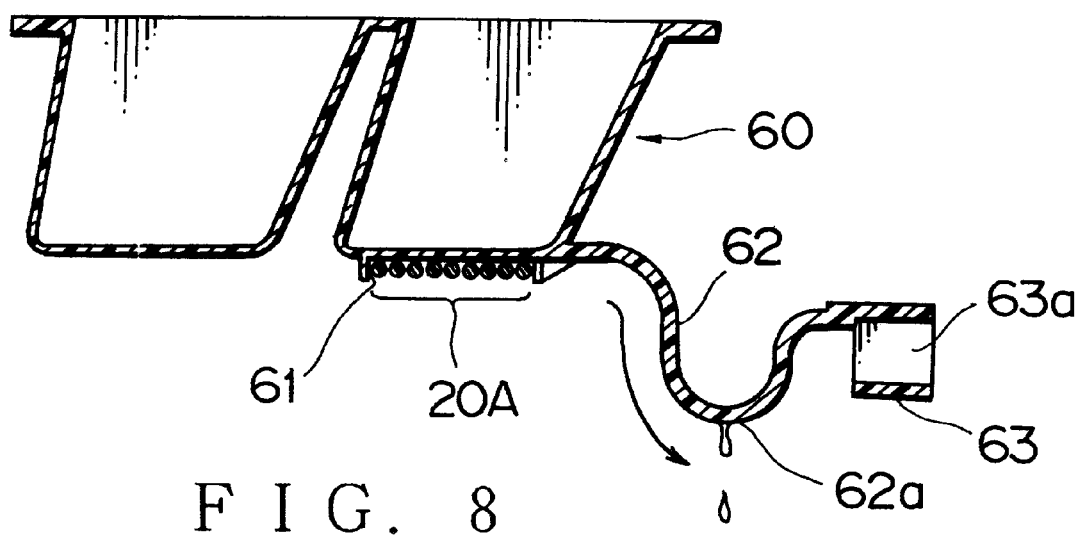
FIG. 8 is a sectional view of an air duct which constitutes a wire harness device for inpane according to the fourth embodiment of the present invention.

Referring to FIG. 8, an explanation will be given of the fourth embodiment of the present invention.

In FIG. 8, on the back surface of an air duct 60, a groove 61 for locating an electric wire bundle 20A constituting a harness for inpane is formed. A bracket continuous to the groove 61 is extended, and a connector holder 63 is formed at the tip of the underside of the bracket 62. At the intermediate position of the bracket 62, an elastic portion 62a curving downward is formed as in the fourth embodiment.

Further, although not shown, the end of the electric wire bundle 20A constituting the harness for the inpane is arranged along the underside of the bracket 62 so as to bend downward so that the unit receiving connector 20B provided at the end of the electric wire bundle 20A (see FIG. 3 or FIG. 5) is housed in the housing space 63a of the connector holder 63.

In such a configuration, water drops deposited to the air duct 60 due to a condensation flow propagate along the wire bundle 20A to flow to the side of the bracket 62. The water drops build up in the top bent as the elastic portion 62a of the electric wire bundle 20A, and thereafter drop.

Thus, it is possible to prevent the water drops from flowing into the unit receiving connector 20B surely, thereby improving reliability of electric connection.

Embodiment 5

Figure 9:
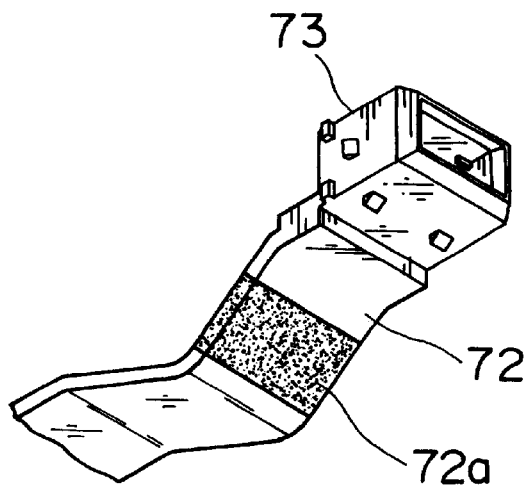
FIG. 9 is a perspective view of a bracket and a connector holder in an air duct which constitute a wire harness device according to the fifth embodiment.
Figure 11:
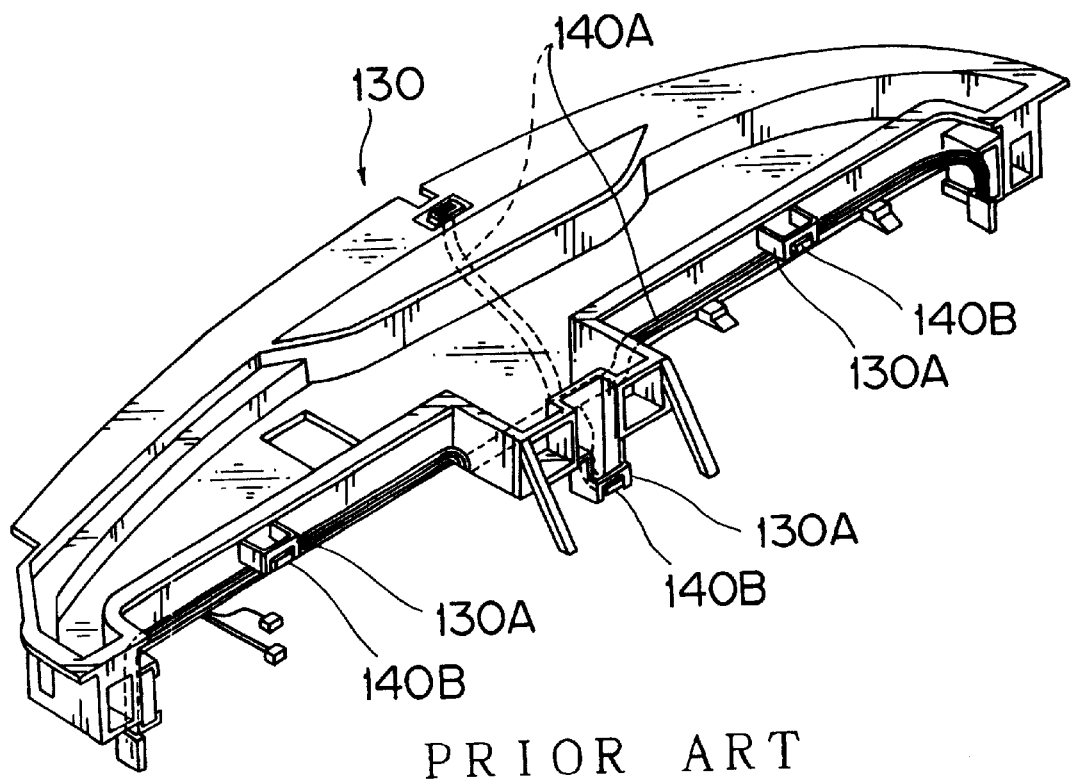
FIG. 11 is a perspective view of an air duct and a harness for inpane which constitute the wire harness device for inpane according to the related art.
Figure 10:
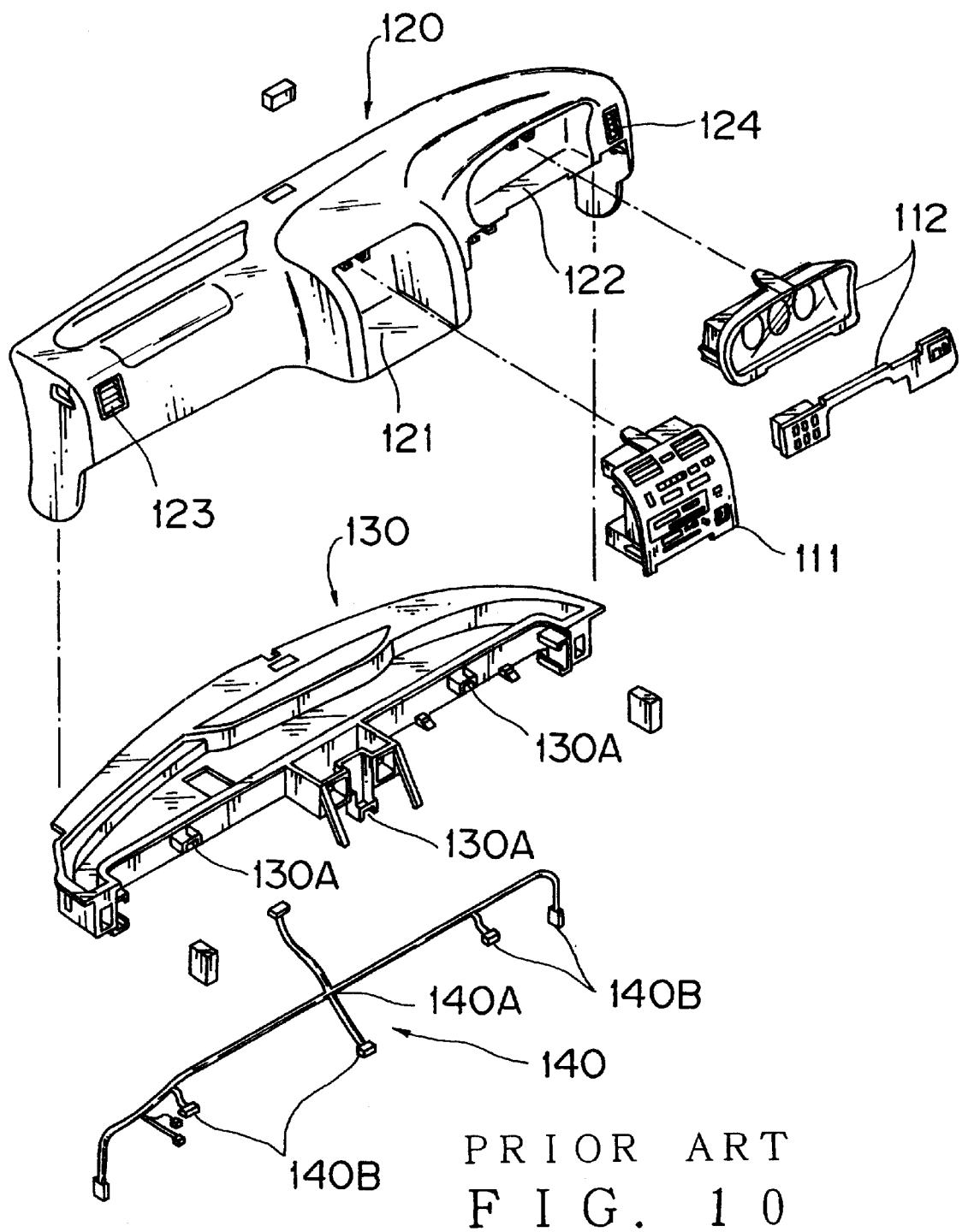
FIG. 10 is an exploded perspective view of a wire harness device according to a related art.
Figure 12:
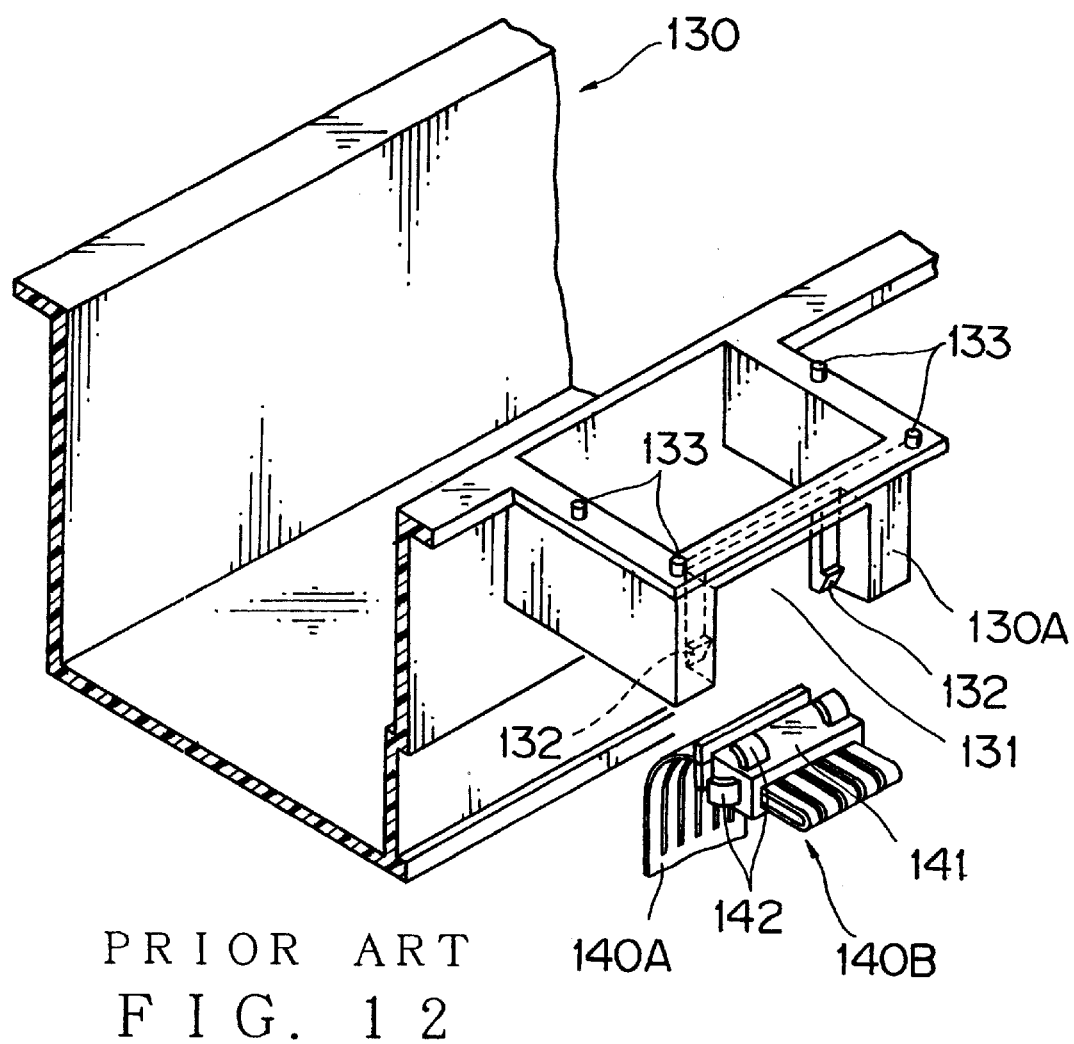
FIG. 12 is an enlarged view of the connector holder attached to the air duct.
Figure 13:
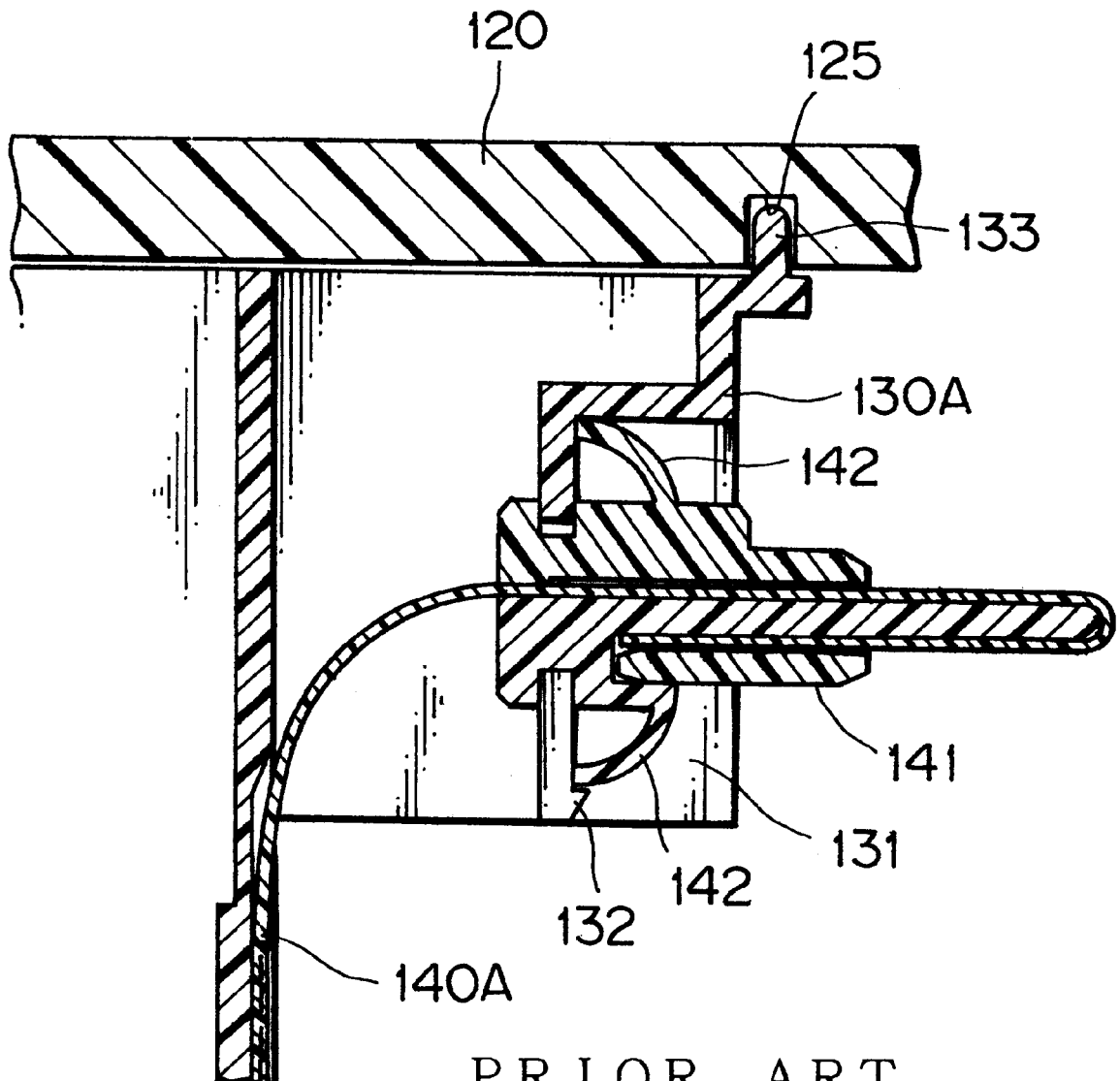
FIG. 13 is a sectional view of the state where an unit receiving connector is attached to the connector holder.

Referring to FIG. 9, an explanation will be given of a wire harness device for inpane according to the fifth embodiment of the present invention.

As seen from FIG. 9, in the wire harness for inpane according to this embodiment, a bracket plate 72 corresponding to the bracket plate 52 in the third embodiment includes an elastic portion 72a made of an elastic material at its intermediate portion.

In this configuration also, as in the third embodiment,

If the inpane or air duct 50 has a position error, the elastic portion 72a of the bracket 72 is moved elastically so that the position discrepancy of the connector holder 73 relative to the insertion hole 12 is corrected (see FIG. 7).

The elastic portion should not be limited to those proposed in the third to fifth embodiments. For example, the intermediate portion of the bracket plate may be thinned to form the elastic portion.

What is claimed is:

1. A wire harness device for inpane comprising:

an electrical instrument unit having a first connector to be connected to a harness;

an instrument panel (inpane) having an attachment portion tor the electrical instrument unit. said attachment portion having an insertion hole corresponding to the first connector;

an air duct to be assembled with the inpane;

a harness for the inpane which is provided with a second connector for receiving said electrical instrument unit and to be connected to the first connector of said electrical instrument unit;

a connector holder for holding said second connector, which is provided in said air duct and movably positioned relative to said insertion hole;

an elastic bracket for elastically supporting said connector holder, said bracket being attached to said air duct and integral to said connector holder, in which said connector holder is engageable with said insertion hole through elastic displacement of said bracket, and wherein said bracket has a curved portion at its intermediate zone so that said connector holder is displacable.

2. A wire harness device for inpane according to claim 1, wherein a groove for locating said harness for the inpane is formed on a rear surface of said air duct, and said bracket is provided integrally to the groove and its elastic portion is curved downwardly.

3. A wire harness device for inpane according to claim 1, wherein said elastic portion is made of an elastic material.

4. A wire harness device for inpane according to claim 1, wherein said elastic portion is thinned.

\* \* \* \* \*